United States Patent
Liu et al.

(10) Patent No.: US 12,133,208 B2
(45) Date of Patent: Oct. 29, 2024

(54) METHOD AND DEVICES FOR WIRELESS COMMUNICATION

(71) Applicant: Telefonaktiebolaget LM Ericsson (publ), Stockholm (SE)

(72) Inventors: Chunhui Liu, Beijing (CN); Huaisong Zhu, Beijing (CN); Yingjun Shi, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 356 days.

(21) Appl. No.: 17/624,750

(22) PCT Filed: Jul. 8, 2019

(86) PCT No.: PCT/CN2019/094992
§ 371 (c)(1),
(2) Date: Jan. 4, 2022

(87) PCT Pub. No.: WO2021/003632
PCT Pub. Date: Jan. 14, 2021

(65) Prior Publication Data
US 2022/0263614 A1    Aug. 18, 2022

(51) Int. Cl.
*H04L 5/00* (2006.01)
*H04W 16/14* (2009.01)
(Continued)

(52) U.S. Cl.
CPC ....... *H04W 72/0453* (2013.01); *H04L 5/0023* (2013.01); *H04L 5/0037* (2013.01);
(Continued)

(58) Field of Classification Search
CPC ... H04B 7/02–12; H04L 5/0001–0098; H04W 8/18–245; H04W 16/02–16;
(Continued)

(56) References Cited

U.S. PATENT DOCUMENTS

2019/0357239 A1* 11/2019 Moon .................... H04W 72/23
2019/0357264 A1* 11/2019 Yi ......................... H04W 72/046
2022/0070845 A1* 3/2022 Stauffer .............. H04W 72/046

FOREIGN PATENT DOCUMENTS

CN      107733623 A     2/2018
CN      108141809 A     6/2018
(Continued)

OTHER PUBLICATIONS

3GPP, "3rd Generation Partnership Project; Technical Specification Group Radio Access Network; NR; Physical channels and modulation (Release 15)", 3GPP TS 38.211 V15.1.0, Mar. 2018, 1-90.
(Continued)

*Primary Examiner* — Timothy J Weidner
(74) *Attorney, Agent, or Firm* — Murphy, Bilak & Homiller, PLLC

(57) ABSTRACT

The present disclosure discloses methods and devices for wireless communication. Specifically, a method for resource allocation at a network device is provided. The method includes allocating a first frequency band to at least one first terminal device utilizing a first radio access technology (RAT), and allocating a second frequency band to at least one second terminal device utilizing a second RAT. The first frequency band is at least partly overlapped with the second frequency band, and the overlapped part of the first and second frequency bands is spatially multiplexed between the at least one first terminal device and the at least one second terminal device.

20 Claims, 9 Drawing Sheets

(51) Int. Cl.
| | |
|---|---|
| *H04W 28/086* | (2023.01) |
| *H04W 72/044* | (2023.01) |
| *H04W 72/0453* | (2023.01) |
| *H04W 72/12* | (2023.01) |
| *H04W 72/51* | (2023.01) |
| *H04W 84/02* | (2009.01) |
| *H04W 88/02* | (2009.01) |
| *H04W 88/10* | (2009.01) |
| *H04W 92/02* | (2009.01) |
| *H04W 92/10* | (2009.01) |

(52) U.S. Cl.
CPC .......... *H04L 5/0073* (2013.01); *H04L 5/0076* (2013.01); *H04W 16/14* (2013.01); *H04W 28/0865* (2023.05); *H04W 72/046* (2013.01); *H04W 72/1215* (2013.01); *H04W 72/51* (2023.01); *H04W 84/02* (2013.01); *H04W 88/02* (2013.01); *H04W 88/10* (2013.01); *H04W 92/02* (2013.01); *H04W 92/10* (2013.01)

(58) Field of Classification Search
CPC ..... H04W 28/02–26; H04W 48/02–20; H04W 56/001–0025; H04W 72/02–569; H04W 74/002–0891; H04W 84/02–16; H04W 88/02–12; H04W 92/02–04; H04W 92/10
See application file for complete search history.

(56) References Cited

FOREIGN PATENT DOCUMENTS

| WO | 2014139588 A1 | 9/2014 |
| WO | 2018128426 A1 | 7/2018 |

OTHER PUBLICATIONS

3GPP, "3rd Generation Partnership Project; Technical Specification Group Radio Access Network; NR; Physical layer procedures for data (Release 15)", 3GPP TS 38.214 V15.1.0, Mar. 2018, 1-77.

3GPP, "3rd Generation Partnership Project; Technical Specification Group Radio Access Network; NR; User Equipment (UE) radio transmission and reception; Part 1: Range 1 Standalone (Release 15)", 3GPP TS 28.101-1 V15.4.0, Dec. 2018, 1-230.

3GPP, "3rd Generation Partnership Project; Technical Specification Group Radio Access Network; NR; User Equipment (UE) radio transmission and reception; Part 2: Range 2 Standalone (Release 15)", 3GPP TS 38.101-2 V15.4.0, Dec. 2018, 1-131.

Unknown, Author, "Characteristics template for 3GPP 5G SRIT", RP-191525, Jun. 7, 2019, 1-65.

Unknown, Author, "China Mobile", China Mobile Limited, 2019, 1-12.

3GPP, "3rd Generation Partnership Project; Technical Specification Group Radio Access Network; NR; User Equipment (UE) radio transmission and reception; Part 1: Range 1 Standalone (Release 15)", 3GPP TS 38.101-1 V15.4.0, Dec. 2018, 1-230.

\* cited by examiner

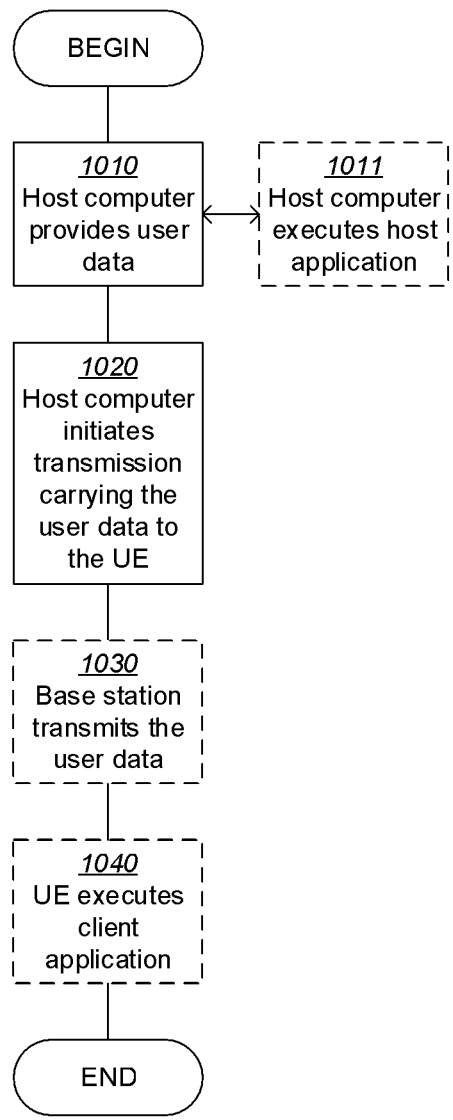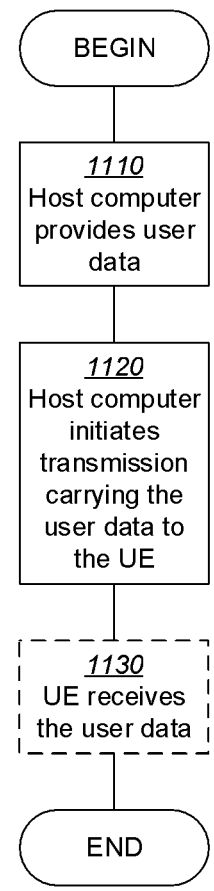
FIG. 10
FIG. 11

METHOD AND DEVICES FOR WIRELESS COMMUNICATION

TECHNICAL FIELD

The present disclosure generally relates to wireless communication, and more particularly, to resource allocation in wireless communication.

BACKGROUND

Third Generation Partnership Project (3GPP) defines a fifth generation (5G) of wireless communication that includes new radio (NR). As an emerging telecommunication standard, 5G NR is a set of enhancements to the 4G Long Term Evolution (LTE) mobile standard.

At the initial stage of NR deployment, one of the most typical configurations for NR is to share or partially share spectrum resource with the 4G network. For example, according to a configuration suggested by CMCC for 2020 NR rollout, there will be 40 MHz spectrum (2575 MHz~2615 MHz) shared between LTE and NR. With more and more User Equipment (UE) phasing out from the 4G network and emerging in the 5G network, spectrum resource will also be gradually shifted from 4G to 5G, which can flexibly balance the near term and long term network requirements.

Multiple options are available on how to share spectrum resource between LTE and NR, one of which is a Physical Resource Block (PRB) level spectrum sharing scheme. Being the most flexible scheme, the PBR level spectrum sharing scheme is efficient only for continuous PRB allocation. For non-continuous PRB allocation, however, many guard bands have to be configured so as to overcome the inter-carrier interference between LTE and NR, which eventually results in a waste of spectrum resource.

SUMMARY

Accordingly, there exists a desire for a resource allocation technique in a wireless communication network, which improves usage efficiency of the frequency spectrum.

In a first aspect of the present disclosure, a method for resource allocation at a network device is provided. The method may include allocating a first frequency band to at least one first terminal device utilizing a first radio access technology, RAT, and allocating a second frequency band to at least one second terminal device utilizing a second RAT. The first frequency band may be at least partly overlapped with the second frequency band, and the overlapped part of the first and second frequency bands may be spatially multiplexed between the at least one first terminal device and the at least one second terminal device.

The first RAT may comprise LTE and the second RAT may comprise NR. The first frequency band may be allocated for at least one non-broadcasting channel of the at least one first terminal device. The second frequency band may be allocated for at least one non-broadcasting channel of the at least one second terminal device. The at least one non-broadcasting channel of the at least one first terminal device may include Physical Downlink Shared Channel (PDSCH) of LTE. The at least one non-broadcasting channel of the at least one second terminal device may include PDSCH of NR.

The method may further comprise allocating a third frequency band for Sounding Reference Signal (SRS) of LTE and/or at least one broadcasting channel of a first type of the at least one first terminal device. The third frequency band may be located in a fixed position within the frequency spectrum to be allocated by the network device. The at least one broadcasting channel of the first type of the at least one first terminal device may include at least one of Cell Reference Signal (CRS), Physical Downlink Control Channel (PDCCH), Physical Control Format Indicator Channel (PCIFICH), Synchronization Signal Block (SSB), Total Radiated Sensitivity (TRS) and Channel State Information-Reference Signal (CSI-RS).

The method may further comprise allocating a fourth frequency band for Sounding Reference Signal (SRS) of NR and/or at least one broadcasting channel of a first type of the at least one second terminal device. The fourth frequency band may be located in another fixed position within the frequency spectrum to be allocated by the network device. The at least one broadcasting channel of the first type of the at least one second terminal device may include at least one of Synchronization Signal Block (SSB), Total Radiated Sensitivity (TRS) and Channel State Information-Reference Signal (CSI-RS).

The method may further comprise allocating a fifth frequency band for at least one broadcasting channel of a second type of the at least one first terminal device. The position of the fifth frequency band may be changeable within the frequency spectrum to be allocated by the network device. The fifth frequency band may be directly adjacent to the third frequency band. The at least one broadcasting channel of the second type of the at least one first terminal device may include at least PDSCH of LTE.

The method may further comprises allocating a sixth frequency band for at least one broadcasting channel of a second type of the at least one second terminal device. The position of the sixth frequency band may be changeable within the frequency spectrum to be allocated by the network device. The sixth frequency band may be directly adjacent to the fourth frequency band. The at least one broadcasting channel of the second type of the at least one second terminal device may include at least PDSCH of NR.

The first frequency band may be directly adjacent to the third or fifth frequency band. The second frequency band may be directly adjacent to the fourth or sixth frequency band. NR may utilize different numerology from LTE.

In a second aspect of the present disclosure, a network device is provided. The network device may comprise a processor and a memory configured to store instructions. The instructions, when executed by the processor, may cause the network device to perform the method of the first aspect.

In a third aspect of the present disclosure, a computer program product is provided. The computer program product comprises program code portions for performing the method of the first aspect when the computer program product is executed on one or more computing devices (e.g., a processor or a distributed set of processors). The computer program product may be stored on a computer readable recording medium, such as a semiconductor memory, DVD, CD-ROM, and so on.

BRIEF DESCRIPTION OF THE DRAWINGS

Implementations of the technique presented herein are described herein below with reference to the accompanying drawings, in which:

FIGS. 10 to 13 are flowcharts illustrating methods implemented in a communication system including a host computer, a base station and a user equipment.

DETAILED DESCRIPTION

Figure 1:
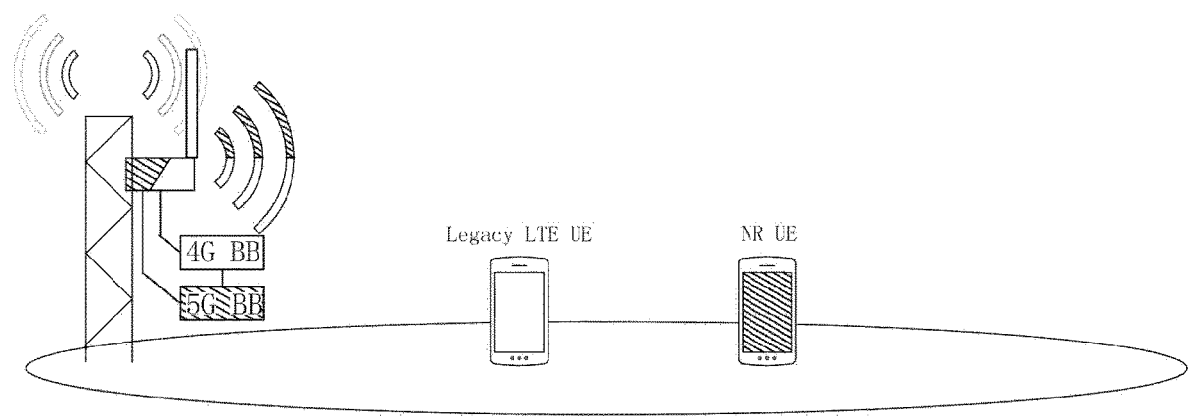
FIG. 1 is a schematic diagram illustrating a wireless communication network where LTE UE and NR UE co-exist.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

As used herein, the term "wireless communication network" refers to a network following any suitable wireless communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), LTE, and/or other suitable 1G, 2G, 2.5G, 2.75G, 3G, 4G, 4.5G, 5G, 6G communication protocols; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" or "network node" refers to a device in a communication network via which a terminal device accesses the network and receives services therefrom. Examples of the network device may include a base station (BS), an access point (AP), or any other suitable device in the wireless communication network. The BS may be, for example, a node B (NodeB or NB), an evolved NodeB (eNodeB or eNB), a next generation NodeB (gNodeB or gNB), a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes, positioning nodes or the like. More generally, however, the network device may represent any suitable device (or group of devices) capable, configured, arranged, and/or operable to enable and/or provide a terminal device access to the wireless communication network or to provide some service to a terminal device that has access to the wireless communication network.

The term "terminal device" refers to any end device that can access a wireless communication network and receive services therefrom. By way of example and not limitation, the terminal device may refer to a mobile terminal, a user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, mobile phones, cellular phones, smart phones, tablets, personal digital assistants (PDAs), wearable devices, vehicle-mounted wireless terminal devices, wireless endpoints, or the like.

In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. As a further example, a UE may represent a device that is intended for sale to, or operation by, a human user but that may not initially be associated with a specific human user.

As yet another example, in an Internet of Things (IoT) scenario, a terminal device may represent a machine or other device that performs monitoring, sensing and/or measurements, and transmits the results of such monitoring, sensing and/or measurements to another terminal device and/or network equipment. The terminal device may in this case be a machine-to-machine (M2M) device, which may in a 3GPP context be referred to as a machine-type communication (MTC) device.

As used herein, a downlink transmission refers to a transmission from a network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

FIG. 1 shows a scenario where LTE UE and NR UE co-exist in a wireless communication network. The LTE base station communicates with LTE UEs over time- and frequency-radio resources, which are different from those used for communications between the NR base station and the NR UEs. Spectrum resource has to be shared by these two different RATs. The PRB level spectrum sharing scheme is believed to be the most flexible and attractive one among the existing solutions.

According to PRB level spectrum sharing, the whole bandwidth of the spectrum resource for a specific Transmission Time Interval (TTI) will be shared by NR and LTE, but either NR or LTE can only occupy a certain part of the whole bandwidth according to real traffic requirement. However, LTE and NR may have different numerology (e.g., LTE 15 kHz while NR 30 KHz). In order to minimize mutual interference due to none orthogonality between different subcarrier spaces, a guard band may be placed in between the subbands for NR and the subbands for LTE.

Figure 2:
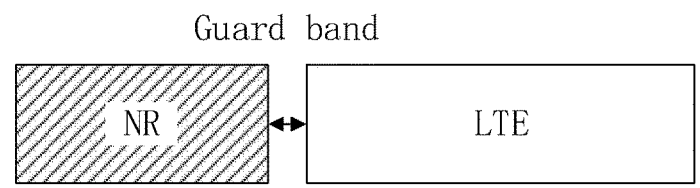
FIG. 2 is a schematic diagram illustrating an example of continuous PRB allocation between LTE and NR in the prior art.

Taking into account the number of guard bands, the PRB level spectrum sharing might be efficient only for continuous PRB allocation, shown in FIG. 2, since only a few guard bands are required. For non-continuous PRB allocation shown in FIG. 3 (a), however, usage efficiency of the spectrum can seriously deteriorate because of the large number of necessary guard bands, which eventually introduce a high percentage of frequency resource being wasted. FIG. 3(b) further illustrates non-continuous PRB allocation with more details. As can be seen in FIG. 3(b). the whole frequency spectrum is partitioned in a plurality of frequency bands with many guard bands. These frequency bands are then allocated by a scheduler to either NR or LTE, exclusively. The frequency resource allocated to LTE/NR may be spatial multiplexed between different UEs of the same RAT.

Despite the frequency waste, non-continuous PRB allocation can also bring about benefits in many cases. Take LTE for an example. Some physical channels may diverse within the whole bandwidth to get frequency diversity gain, such as frequency hopping configured for Voice over IP (VoIP) and Physical Uplink Control Channel (PUCCH) configured to periodically hop between edges of uplink frequency bands. A similar situation also applies to NR.

In order to avoid any inter-carrier interference between NR and LTE, the skilled person so far can either restrict LTE/NR scheduler to avoid frequency hopping, which sacrifices system performance that could have been obtained from diversity gain, or reserve more frequency resources for the necessary guard bands, which results in a waste of spectrum resource.

Therefore, it may be advantageous to allocate the frequency spectrum between LTE and NR in such a way that system performance and the usage efficiency of the frequency spectrum can be balanced.

Figure 4:
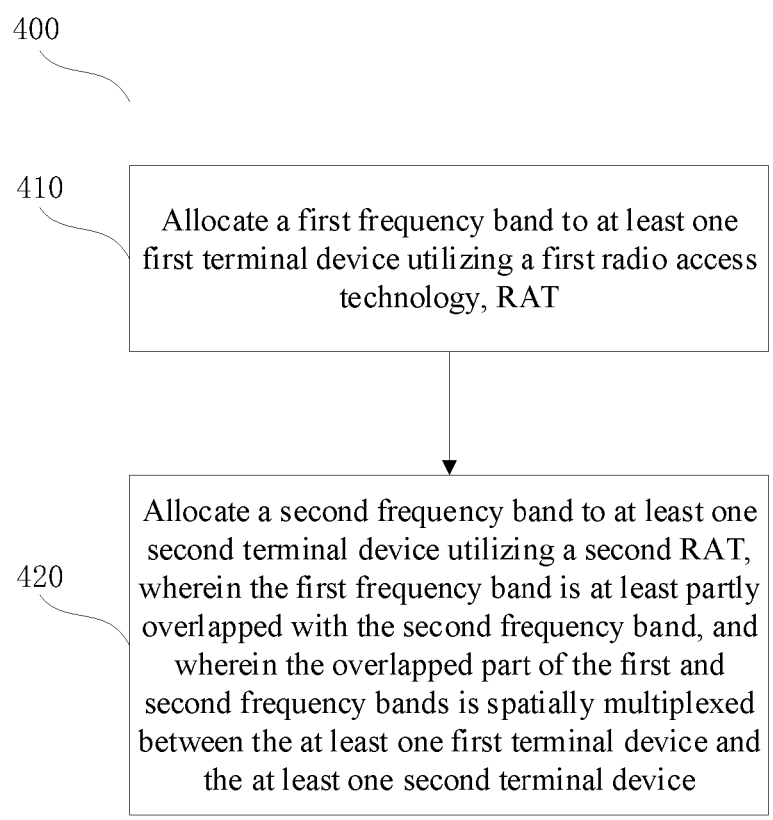
FIG. 4 is a flowchart illustrating a method for resource allocation according to an aspect of the present disclosure.

FIG. 4 is a flowchart illustrating a method 400 for resource allocation according to an aspect of the present disclosure.

At block 410, a first frequency band is allocated to at least one first terminal device utilizing a first RAT, e.g. LTE. At block 420, a second frequency band is allocated to at least one second terminal device utilizing a second RAT, e.g. NR. The first frequency band is at least partly overlapped with the second frequency band, and the overlapped part of the first and second frequency bands is spatially multiplexed between the at least one first terminal device (e.g., LTE UE) and the at least one second terminal device (e.g., NR UE). As said, according to the method 400, the same time- and frequency-radio resources can be shared between two different RATs by spatial multiplexing. Details will be described with reference to FIG. 5(a) and FIG. 5(b) hereinafter.

Figure 5A:
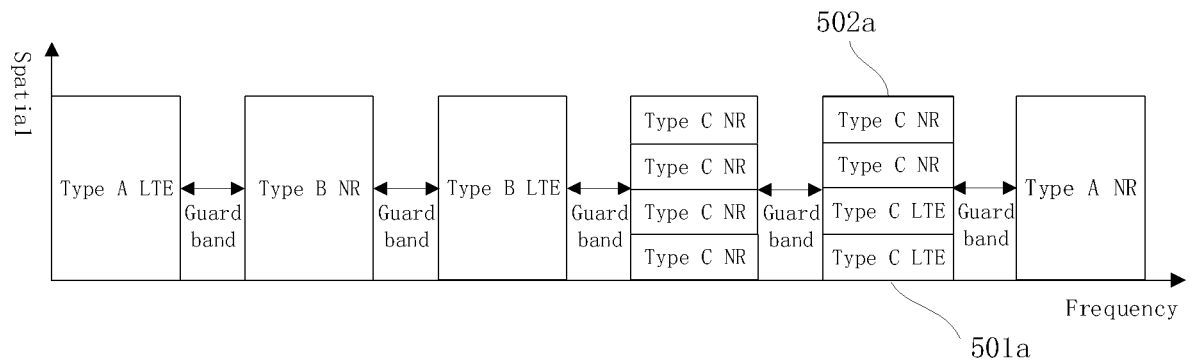
FIG. 5(a) is a schematic diagram illustrates an example of resource allocation between LTE and NR according to an aspect of the present disclosure.

FIG. 5(a) illustrates an example of resource allocation between LTE and NR according to an aspect of the present disclosure.

The first frequency band (501a) may be allocated for one or more non-broadcasting channels of one or more LTE UEs. Examples of the non-broadcasting channel(s) of LTE (referred to as "Type C LTE" in FIGS. 5(a) and 5(b)) may include PDSCH of LTE that is specific for an LTE UE, in other words, not for the purpose of broadcasting. Furthermore, uplink channels of LTE based on Demodulation Reference Signal (DMRS) may also be considered as non-broadcasting channels. Exceptions are Sounding Reference Signal (SRS) and Physical Random Access Channel (PRACH), because the SRS/PRACH configuration is semi-static; and once configured, it is mandatory for UE to communicate at the configured time slot and the assigned frequency slot.

The two blocks representing "Type C LTE" are merely for the purpose of explanation and not limitation. The number of LTE UEs to which the first frequency band (501a) is allocated may vary depending on the real communication scenario, i.e., the capability of the network device, the number and/or spatial information of the LTE UEs that are dispersed throughout the wireless communication network and request frequency resource at a specific TTI. As an example, the network device may collect spatial information of the LTE UEs based on the uplink sounding, uplink DMRS and/or uplink PRACH received from the LTE UEs.

The position and width of the first frequency band (501a) within the frequency spectrum may be then decided by the network device. LTE may utilize orthogonal frequency division multiplexing (OFDM) on the downlink, which partitions the bandwidth into multiple (K) orthogonal subcarriers. Each subcarrier may be modulated with data. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Similar to the aspects described above with respect to LTE, the second frequency band (502a) may be allocated for one or more non-broadcasting channels of one or more NR UEs. Examples of the non-broadcasting channel(s) of NR (referred to as "Type C NR" in FIGS. 5(a) and 5(b)) may include PDSCH of NR that is specific for an NR UE, in other words, not for the purpose of broadcasting. Furthermore, uplink channels of NR based on DMRS may also be considered as non-broadcasting channels. Exceptions are SRS and PRACH, because the SRS/PRACH configuration is semi-static; and once configured, it is mandatory for UE to communicate at the configured time slot and the assigned frequency slot.

The two blocks representing "Type C NR" are also merely for the purpose of explanation and not limitation. The number of NR UEs to which the second frequency band (502a) is allocated may vary depending on the real communication scenario, i.e., the capability of the network device, the number and/or spatial information of the NR UEs that are dispersed throughout the wireless communication network and request frequency resource at the specific TTI. Further, the network device may collect spatial information of the NR UEs based on the uplink sounding, uplink DMRS and/or uplink PRACH received from the NR UEs.

The position and width of the second frequency band (502a) within the frequency spectrum may be then decided by the network device. It is noted that NR may also utilize OFDM but with different numerology from LTE, such as 30 kHz, 60 kHz.

In terms of width and position within the frequency spectrum to be allocated by the network device, the first frequency band (501a) allocated to the LTE UEs may be the same as the second frequency band (502a) allocated to the NR UEs, which are spatially distinguishable from the LTE UEs in the view of the network device. Put differently, the same frequency band (501a, 502a) is spatially multiplexed by both LTE UEs and NR UEs.

Both NR and LTE may be deployed with massive MIMO. In MIMO, the more antennas the transmitter/receiver is equipped with, the more the possible signal paths (e.g., spatial streams) and the better the performance in terms of data rate and link reliability. Massive MIMO may involve the use of a very large number of service antennas that can be operated coherently and adaptively. The additional antennas may help focus the transmission and reception of signal energy into smaller regions of space. This can lead to huge improvements in throughput and energy efficiency, in particularly when combined with simultaneous scheduling of a large number of UEs. Massive MIMO can be applied in time division duplex (TDD) operation and also in frequency division duplex (FDD) operation. The use of massive MIMO technology enables the network device to exploit the spatial domain to support spatial multiplexing, beamforming and transmit diversity.

Moreover, the LTE node (e.g., LTE base station) and the NR node (e.g., NR base station) of the network device may share information with each other so as to perform a joint channel processing between LTE and NR. It is further recommended that LTE and NR share the same radio to ensure the same channel observation. Due to the MU-MIMO (or spatial multiplexing), LTE and NR base stations may transmit to UEs and receive from UEs over the same time- and frequency-radio resources.

Figure 3A:
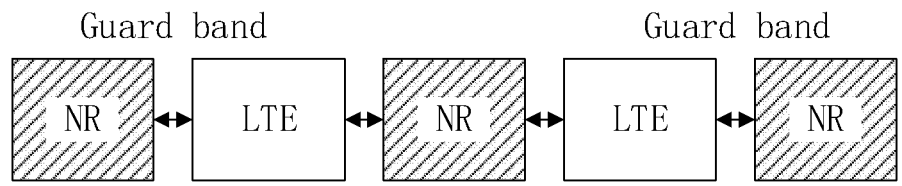
FIG. 3(a) is a schematic diagram illustrating an example of non-continuous PRB allocation between LTE and NR in the prior art.
Figure 3B:
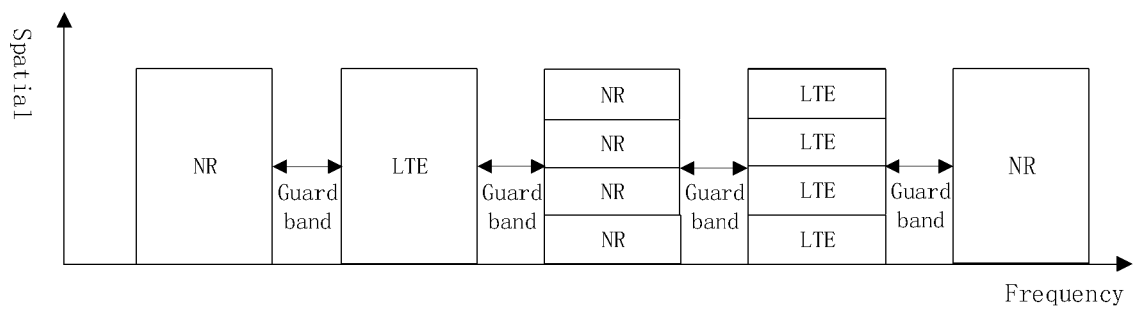
FIG. 3(b) is a schematic diagram illustrating the example of non-continuous PRB allocation with more details.

Compared to FIG. 3, spatially multiplexing the frequency band (501a, 502a) between LTE and NR, as shown in FIG. 5(a), enables a more flexible allocation of frequency resource which leads to a more sufficient usage thereof. This may be the case when a frequency band is exclusively allocated to UEs utilizing one RAT for the whole spatial domain within the coverage of the network device, yet some UEs of the same RAT at certain spatial areas do not necessarily need the allocated frequency band at the specific TTI, due to their limited and/or not time-sensitive demands. In this case, it may be advantageous to allocate the frequency band to UEs utilizing another RAT located at the same certain spatial areas, especially when UEs utilizing the latter RAT have more demands on spectrum resources at this specific TTI.

Figure 5B:
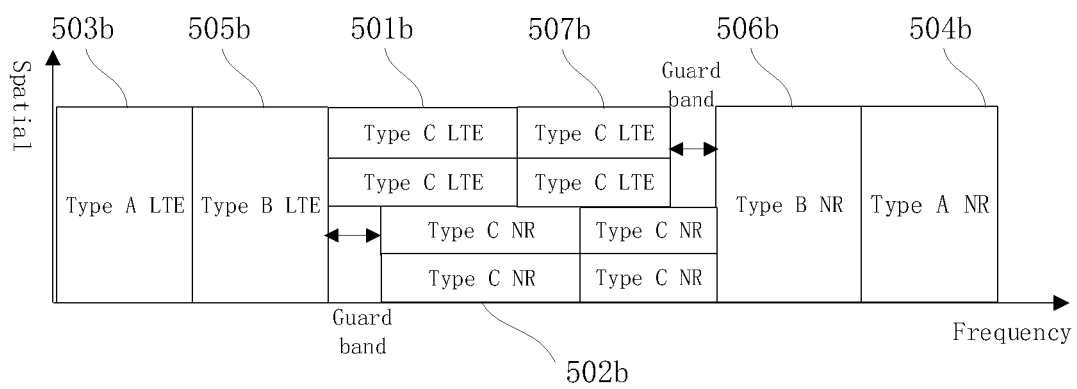
FIG. 5(b) is a schematic diagram illustrates another example of resource allocation between LTE and NR according to one aspect of the present disclosure.

FIG. 5(b) illustrates another example of resource allocation between LTE and NR according to one aspect of the present disclosure, in which, the overlapped portion of the first frequency band (501b) and the second frequency band (502b) is spatially multiplexed between LTE UEs and NR UEs.

The aspects described above with reference to FIG. 5(a) also apply to the example of FIG. 5(b) at least to the extent that the first/second frequency bands (501b, 502b) may be decided by the network device for non-broadcasting channels ("Type C") and at least partly spatially multiplexed between LTE and UE.

Compared to FIG. 5(a), the first frequency band (501b) allocated to LTE in FIG. 5(b) may be only partly overlapped with the second frequency band (502b) allocated to NR. To be more specific, the first frequency band (501b) occupies the guard band arranged between the second frequency band (502b) and the fifth frequency band (505b) also allocated to LTE. It should be noted that, in the prior art, guard bands cover the whole spatial domain of the network device, because each of the frequency bands is also exclusively allocated to only one RAT for the whole spatial domain at a specific TTI (see FIG. 3). Such a guard band is therefore necessary to minimize mutual interference between two different RATs.

On the other hand, as a result of spatial multiplexing, the first frequency band (501b) may be arranged directly adjacent to the fifth frequency band (505b), because both the frequency bands (501b, 505b) are allocated to the same RAT (i.e. LTE). It is therefore advantageous that the frequency resource of the guard band can be used at some spatial areas, thereby increasing the usage efficiency of the frequency spectrum.

Moreover, for both of the examples of FIG. 5(a) and FIG. 5(b), frequency bands may be allocated depending on the nature of physical channels. To explain further, physical channels may be categorized into non-broadcasting channels ("Type C") and broadcasting channels. As the name suggests, broadcasting channels should be broadcasted to the whole coverage area of the network device and, thus, frequency bands allocated to these channels cannot be spatially multiplexed between different RATs, different from the non-broadcasting channels.

The broadcasting channels may further be divided in two types. The broadcasting channels of the first type (referred to as "Type A" in FIGS. 5(a) and 5(b)) have a fixed position within the frequency spectrum, while the broadcasting channels of the second type (referred to as "Type B" in FIGS. 5(a) and 5(b)) have a changeable position within the frequency spectrum. Put differently, the network device (e.g., scheduler) can change the position of the frequency band allocated to the second-type broadcasting channels. Accordingly, the network device may first allocate frequency bands for at least a broadcasting channel of the first type. Note that, whether to first allocate frequency bands to LTE or NR is not limited by the present disclosure.

Examples of the first-type broadcasting channels for LTE ("Type A LTE") may include Cell Reference Signal (CRS), Physical Downlink Control Channel (PDCCH), Physical Control Format Indicator Channel (PCIFICH), Synchronization Signal Block (SSB), Total Radiated Sensitivity (TRS), and Channel State Information-Reference Signal (CSI-RS). The spectrum position of LTE CRS/PDCCH/PCIFICH may be fully based on UE Radio Network Temporary Identifier (RNTI) and transmission subframe. The spectrum position of SSB, TRS/CSI-RS may be determined at cell setup.

Additionally, Sounding Reference Signal (SRS) of LTE may also be viewed as a first-type broadcasting channel, because SRS, used for spatial characteristic detection for Downlink MU-MIMO, normally hops inside the whole spectrum and its PRB allocation is determined by Radio Resource Control (RRC) configuration.

Examples of the first-type broadcasting channels for NR ("Type A NR") may include Synchronization Signal Block (SSB), Total Radiated Sensitivity (TRS), and Channel State Information-Reference Signal (CSI-RS). Additionally, SRS of NR may also be viewed as a first-type broadcasting channel for the same reason as the SRS of LTE.

After the frequency bands for the first-type broadcasting channels of LTE/NR are allocated, frequency bands may be arranged for the second-type broadcasting channels of LTE/NR. It is advantageous that a frequency band allocated to the second-type broadcasting channels of one RAT is directly adjacent to a frequency band allocated to the first-type broadcasting channels of the same RAT. In doing so, no guard bands will be needed therebetween. Frequency bands for Type C LTE/NR may be arranged after the second-type broadcasting channels of LTE/NR, which also enables a more flexible scheduling of the frequency resources.

Examples of the second-type broadcasting channels for LTE ("Type B LTE") may include Physical Downlink Shared Channel (PDSCH) of LTE for the purpose of broadcasting. To explain further, when base stations page UEs, they do not have channel information of UEs and thus have to broadcast the messages.

Similarly, examples of the second-type broadcasting channels for NR ("Type B NR") may include Physical Downlink Shared Channel, PDSCH, of NR for the purpose of broadcasting.

Referring back to FIG. 5(b), there exist guard bands only between the second frequency band (502b) and the fifth frequency band (505b), and between the sixth frequency band (506b) and another frequency band (507b), both guard bands only covering a part of the whole spatial domain. Compared to the allocation pattern of FIG. 3, many guards bands have been eliminated, which increases the usage efficiency of the whole spectrum frequency.

The following example is provided to have a better understanding of how many frequency resources can be occupied by guard bands. In case there are 6 subbands (i.e., the blocks or islands (an island refers to a group of consecutive PRBs assigned to a terminal device) shown in FIGS. 3(b) and 5(a)) allocated to LTE, normally 12 guard bands need to be arranged. With each guard band consumes 2 PRBs or 4 PRBs (depending on isolation requirements for guard band), it amounts to 24% (or even 48%) frequency resource being wasted (2PRB/guard band*12 guard band/100 PRB LTE cell=24%).

Figure 6:
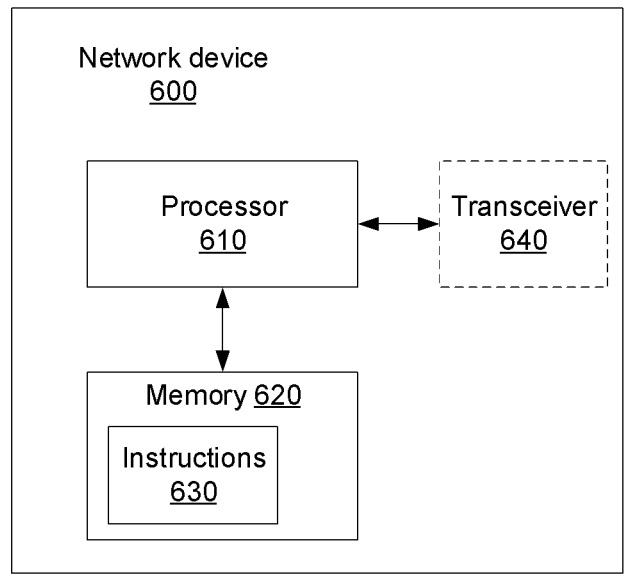
FIG. 6 is a block diagram illustrating an exemplary network device according to an aspect of the present disclosure.

FIG. 6 is a block diagram of a network device 600 according to an aspect of the present disclosure, which can be, e.g., the network device as described in connection with FIG. 4.

The network device 600 includes a processor 610 and a memory 620. Optionally, the network device 600 may further include a transceiver 640 coupled to the processor 610. The memory 620 contains instructions 630 executable by the processor 610 to cause the network device 600 to perform the actions of the method 400. Particularly, the memory 620 may contain instructions that, when executed by the processor 610, cause the network device 600 to allocate a first frequency band to at least one first terminal device utilizing a first RAT, and allocate a second frequency band to at least one second terminal device utilizing a second RAT. The first frequency band may be at least partly overlapped with the second frequency band, and the overlapped part of the first and second frequency bands may be spatially multiplexed between the at least one first terminal device and the at least one second terminal device.

According to an embodiment, the first RAT may comprise LTE and the second RAT may comprise NR.

According to an embodiment, the first frequency band may be allocated for at least one non-broadcasting channel of the at least one first terminal device. The second frequency band may be allocated for at least one non-broadcasting channel of the at least one second terminal device.

According to an embodiment, the at least one non-broadcasting channel of the at least one first terminal device may include Physical Downlink Shared Channel (PDSCH) of LTE.

According to an embodiment, the at least one non-broadcasting channel of the at least one second terminal device may include PDSCH of NR.

According to an embodiment, the method further comprise allocating a third frequency band for Sounding Reference Signal (SRS) of LTE and/or at least one broadcasting channel of a first type of the at least one first terminal device. The third frequency band may be located in a fixed position within the frequency spectrum to be allocated by the network device. The at least one broadcasting channel of the first type of the at least one first terminal device may include at least one of Cell Reference Signal (CRS), Physical Downlink Control Channel (PDCCH), Physical Control Format Indicator Channel (PCIFICH), Synchronization Signal Block (SSB), Total Radiated Sensitivity (TRS) and Channel State Information-Reference Signal (CSI-RS).

According to an embodiment, the method further comprises allocating a fourth frequency band for Sounding Reference Signal (SRS) of NR and/or at least one broadcasting channel of a first type of the at least one second terminal device. The fourth frequency band may be located in another fixed position within the frequency spectrum to be allocated by the network device. The at least one broadcasting channel of the first type of the at least one second terminal device may include at least one of Synchronization Signal Block (SSB), Total Radiated Sensitivity (TRS) and Channel State Information-Reference Signal (CSI-RS).

According to an embodiment, the method further comprises allocating a fifth frequency band for at least one broadcasting channel of a second type of the at least one first terminal device. The position of the fifth frequency band may be changeable within the frequency spectrum to be allocated by the network device. The fifth frequency band may be directly adjacent to the third frequency band.

According to an embodiment, the at least one broadcasting channel of the second type of the at least one first terminal device may include at least PDSCH of LTE.

According to an embodiment, the method further comprises allocating a sixth frequency band for at least one broadcasting channel of a second type of the at least one second terminal device. The position of the sixth frequency band may be changeable within the frequency spectrum to be allocated by the network device. The sixth frequency band may be directly adjacent to the fourth frequency band.

According to an embodiment, the at least one broadcasting channel of the second type of the at least one second terminal device may include at least PDSCH of NR.

According to an embodiment, the first frequency band may be directly adjacent to the third or fifth frequency band.

According to an embodiment, the second frequency band may be directly adjacent to the fourth or sixth frequency band. NR may utilize different numerology from LTE.

According to an embodiment, NR may utilize different numerology from LTE.

It should be noted that, more details described with reference to FIGS. 5(a) and 5(b) also apply here and may be omitted.

The memory 620 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processor 610 may be of any type suitable to the local technical environment, and may include one or more of general purpose processors, special purpose processors (e.g., Application Specific Integrated Circuit (ASICs)), microprocessors, digital signal processors (DSPs) and processors based on multicore processor architecture, as non-limiting examples.

Figure 7:
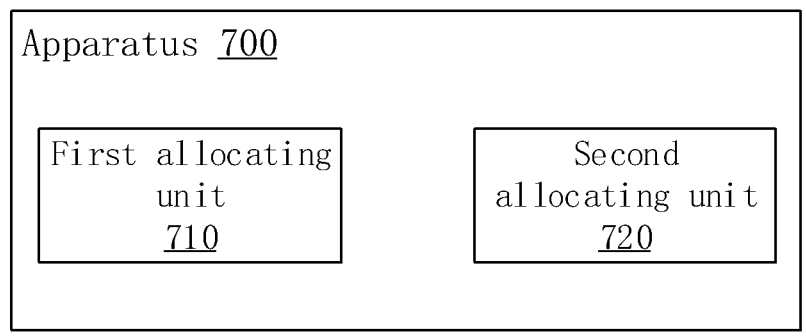
FIG. 7 is a block diagram illustrating an exemplary apparatus that can perform the method of FIG. 4 according to an aspect of the present disclosure.

FIG. 7 is a block diagram of an apparatus 700 according to embodiments of the present disclosure, which can be configured to perform the method 400 as described in connection with FIG. 4.

The apparatus 700 may include a first allocating unit 710 and a second allocating unit 720. The first allocating unit 710 may be configured to allocate a first frequency band to at least one first terminal device utilizing a first radio access technology, and the second allocating unit 720 may be configured to allocate a second frequency band to at least one second terminal device utilizing a second, wherein the first frequency band is at least partly overlapped with the second frequency band, and the overlapped part of the first and second frequency bands is spatially multiplexed between the at least one first terminal device and the at least one second terminal device.

The apparatus 700 can be implemented as the network device 600 or as a software and/or a physical device within the network device 600 or communicatively coupled to the network device 600.

Further details about the apparatus 700 are similar to those described with respect to FIGS. 5(a) and 5(b) and are omitted here.

The units as described in FIG. 7 may be implemented as software and/or hardware, or a device comprising the software and/or the hardware, which is not limited. For example, they can be implemented as computer readable programs that can be executed by a processor. Alternatively, they can be implemented as processing circuitry such as ASICs and/or field programmable gate arrays (FPGAs).

The present disclosure may also provide computer readable media having instructions thereon. The instructions, when executed by a processor of a network device or a terminal device, cause the network device or terminal device to perform the method according to the embodiments as described above. The computer readable media may include computer-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The computer readable media may also include computer readable transmission media (also called a carrier), for example, electrical, optical, radio, acoustical or other form of propagated signals-such as carrier waves, infrared signals, and the like.

The present disclosure may also provide computer program products including instructions. The instructions, when executed by a processor of a network device or a terminal device, cause the network device or terminal device to perform the method according to the embodiments as described above.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, units, apparatus, systems, techniques or methods described herein may be implemented in, as non-limiting examples, hardware, software, firmware, special purpose circuits or logic, general purpose hardware or controller or other computing devices, or some combination thereof.

Figure 8:
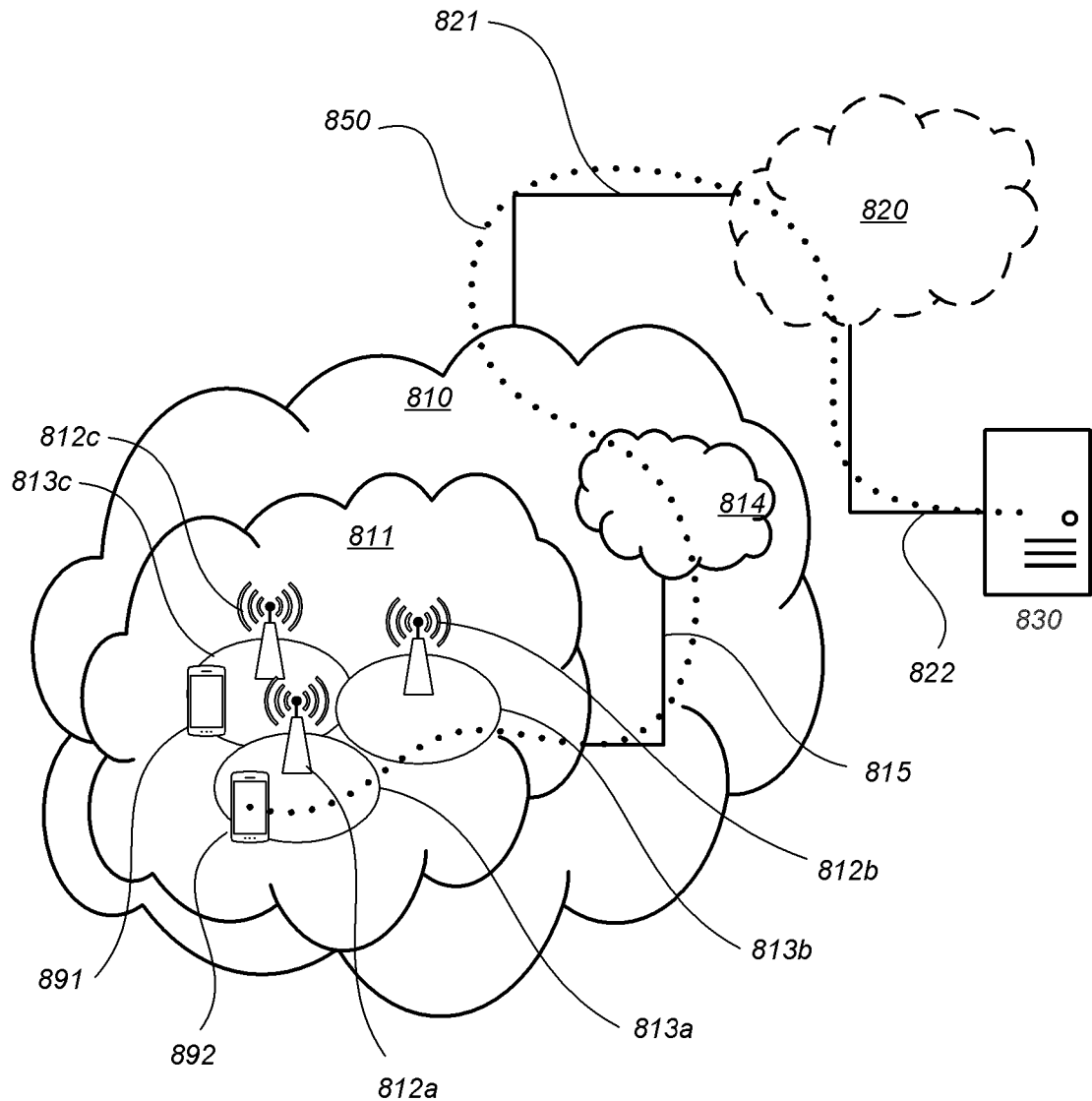
FIG. 8 schematically illustrates a telecommunication network connected via an intermediate network to a host computer.

With reference to FIG. 8, in accordance with an embodiment, a communication system includes a telecommunication network 810, such as a 3GPP-type cellular network, which comprises an access network 811, such as a radio access network, and a core network 814. The access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to the core network 814 over a wired or wireless connection 815. A first user equipment (UE) 891 located in coverage area 813c is configured to wirelessly connect to, or be paged by, the corresponding base station 812c. A second UE 892 in coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. The connections 821, 822 between the telecommunication network 810 and the host computer 830 may extend directly from the core network 814 to the host computer 830 or may go via an optional intermediate network 820. The intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system of FIG. 8 as a whole enables connectivity between one of the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, a base station 812 may not or need not be informed about the past routing of an incoming downlink communication with data originating from a host computer 830 to be forwarded (e.g., handed over) to a connected UE 891. Similarly, the base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In a communication system 900, a host computer 910 comprises hardware 915 including a communication interface 916 configured to set up and maintain a wired or wireless connection with an interface of a different communication device of the communication system 900. The host computer 910 further comprises processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as a UE 930 connecting via an OTT connection 950 terminating at the UE 930 and the host computer 910. In providing the service to the remote user, the host application 912 may provide user data which is transmitted using the OTT connection 950.

The communication system 900 further includes a base station 920 provided in a telecommunication system and comprising hardware 925 enabling it to communicate with the host computer 910 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with a UE 930 located in a coverage area (not shown in FIG. 9) served by the base station 920. The communication interface 926 may be configured to facilitate a connection 960 to the host computer 910. The connection 960 may be direct or it may pass through a core network (not shown in FIG. 9) of the telecommunication system and/or through one or more intermediate networks outside the telecommunication system. In the embodiment shown, the hardware 925 of the base station 920 further includes processing circuitry 928, which may comprise one or more programmable processors, application-specific integrated circuits, field programmable gate arrays or combinations of these (not shown) adapted to execute instructions. The base station 920 further has software 921 stored internally or accessible via an external connection.

The communication system 900 further includes the UE 930 already referred to. Its hardware 935 may include a radio interface 937 configured to set up and maintain a wireless connection 970 with a base station serving a coverage area in which the UE 930 is currently located. The hardware 935 of the UE 930 further includes processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

Figure 9:
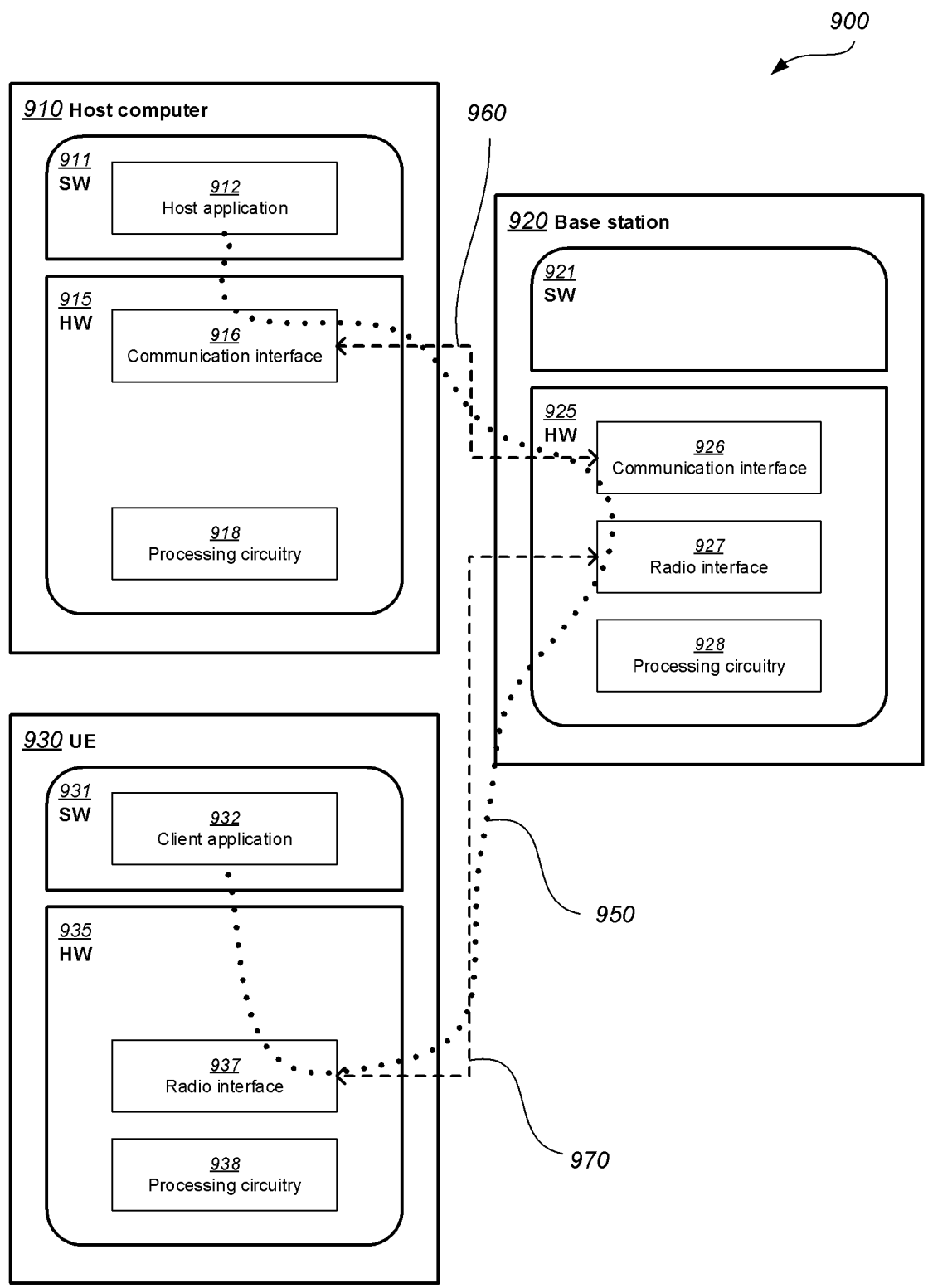
FIG. 9 is a generalized block diagram of a host computer communicating via a base station with a user equipment over a partially wireless connection.

It is noted that the host computer 910, base station 920 and UE 930 illustrated in FIG. 9 may be identical to the host computer 830, one of the base stations 812a, 812b, 812c and one of the UEs 891, 892 of FIG. 8, respectively. This is to say, the inner workings of these entities may be as shown in FIG. 9 and independently, the surrounding network topology may be that of FIG. 8.

In FIG. 9, the OTT connection 950 has been drawn abstractly to illustrate the communication between the host computer 910 and the use equipment 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

The wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may improve the efficiency of resource usage and thereby provide benefits such as better save network resources.

A measurement procedure may be provided for the purpose of monitoring data rate, latency and other factors on which the one or more embodiments improve. There may further be an optional network functionality for reconfiguring the OTT connection 950 between the host computer 910 and UE 930, in response to variations in the measurement results. The measurement procedure and/or the network functionality for reconfiguring the OTT connection 950 may be implemented in the software 911 of the host computer 910 or in the software 931 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer's 910 measurements of throughput, propagation times, latency and the like. The measurements may be implemented in that the software 911, 931 causes messages to be transmitted, in particular empty or 'dummy' messages, using the OTT connection 950 while it monitors propagation times, errors etc.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In a first step 1010 of the method, the host computer provides user data. In an optional substep 1011 of the first step 1010, the host computer provides the user data by executing a host application. In a second step 1020, the host computer initiates a transmission carrying the user data to the UE. In an optional third step 1030, the base station transmits to the UE the user data which was carried in the transmission that the host computer initiated, in accordance with the teachings of the embodiments described throughout this disclosure. In an optional fourth step 1040, the UE executes a client application associated with the host application executed by the host computer.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In a first step 1110 of the method, the host computer provides user data. In an optional substep (not shown) the host computer provides the user data by executing a host application. In a second step 1120, the host computer initiates a transmission carrying the user data to the UE. The transmission may pass via the base station, in accordance with the teachings of the embodiments described throughout this disclosure. In an optional third step 1130, the UE receives the user data carried in the transmission.

Figures 12, 13:
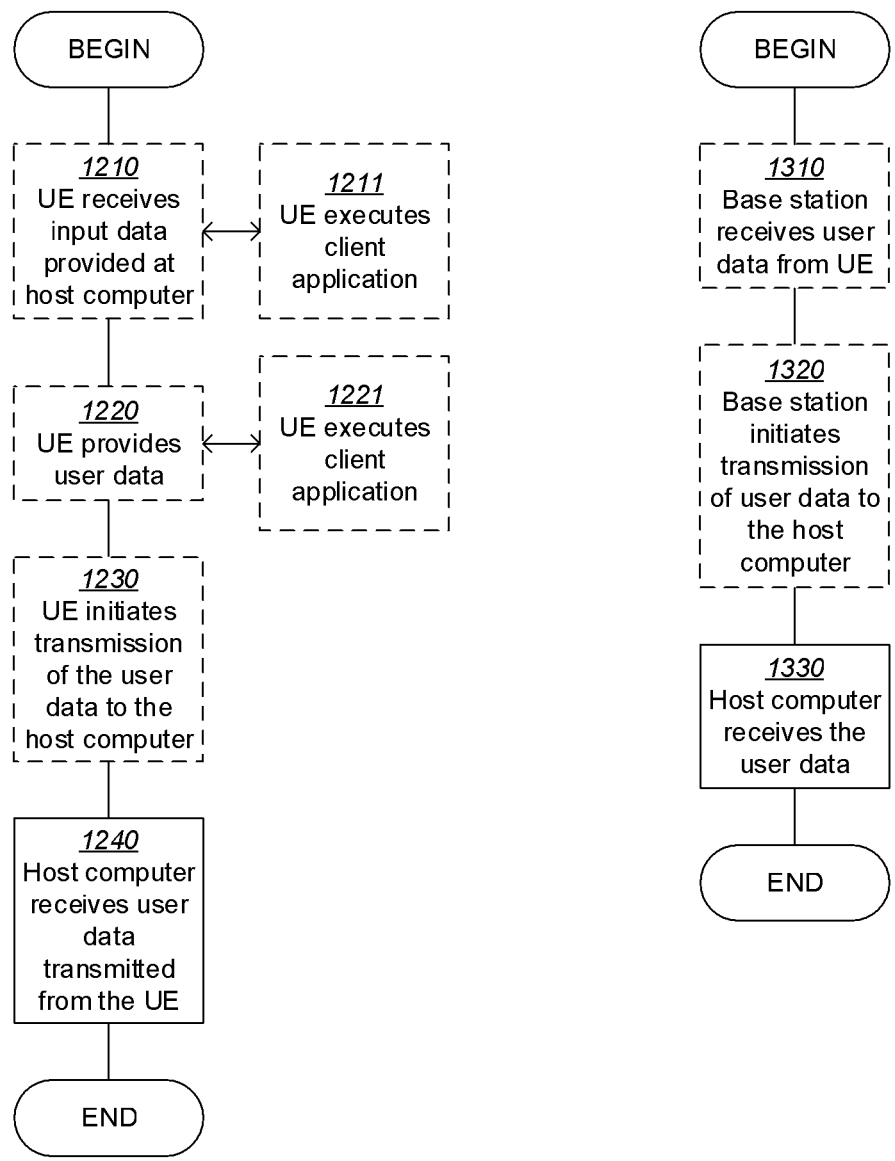

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In an optional first step 1210 of the method, the UE receives input data provided by the host computer. Additionally or alternatively, in an optional second step 1220, the UE provides user data. In an optional substep 1221 of the second step 1220, the UE provides the user data by executing a client application. In a further optional substep 1211 of the first step 1210, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1230, transmission of the user data to the host computer. In a fourth step 1240 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In an optional first step 1310 of the method, in accordance with the teachings of the embodiments described throughout this disclosure, the base station receives user data from the UE. In an optional second step 1320, the base station initiates transmission of the received user data to the host computer. In a third step 1330, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method for resource allocation at a network device, comprising:
    allocating a first frequency band to at least one first terminal device utilizing a first radio access technology (RAT), the first RAT comprising long term evolution (LTE);
    allocating a second frequency band to at least one second terminal device utilizing a second RAT, the second RAT comprising new radio (NR); and
    allocating a third frequency band for Sounding Reference Signal (SRS) of NR and/or at least one broadcasting channel of a first type of the at least one second terminal device, wherein the third frequency band is located in a fixed position within the frequency spectrum to be allocated by the network device;
    wherein the first frequency band is at least partly overlapped with the second frequency band, and wherein the overlapped part of the first and second frequency bands is spatially multiplexed between the at least one first terminal device and the at least one second terminal device, and wherein the at least one broadcasting channel of the first type of the at least one second terminal device includes at least one of Cell Reference Signal (CRS), Physical Downlink Control Channel (PDCCH), Physical Control Format Indicator Channel (PCIFICH), Synchronization Signal Block (SSB), Total Radiated Sensitivity (TRS), and Channel State Information-Reference Signal (CSI-RS).

2. The method of claim 1, wherein the first frequency band is allocated for at least one non-broadcasting channel of the at least one first terminal device, and wherein the second frequency band is allocated for at least one non-broadcasting channel of the at least one second terminal device.

3. The method of claim 2, wherein the at least one non-broadcasting channel of the at least one first terminal device includes Physical Downlink Shared Channel (PDSCH) of LTE.

4. The method of claim 2, wherein the at least one non-broadcasting channel of the at least one second terminal device includes Physical Downlink Shared Channel (PDSCH) of NR.

5. The method of claim 1, wherein the first second frequency band is directly adjacent to the third frequency band.

6. The method of claim 1, wherein the method further comprises:
allocating a fourth frequency band for at least one broadcasting channel of a second type of the at least one second terminal device, wherein the position of the fourth frequency band is changeable within the frequency spectrum to be allocated by the network device;
wherein the fourth frequency band is directly adjacent to the third frequency band.

7. The method of 6, wherein the second frequency band is directly adjacent to the fourth frequency band.

8. The method of claim 6, wherein the at least one broadcasting channel of the second type of the at least one second terminal device includes at least Physical Downlink Shared Channel (PDSCH) of NR.

9. The method of claim 1, wherein the method further comprises:
allocating a fifth frequency band for Sounding Reference Signal (SRS) of LTE and/or at least one broadcasting channel of a first type of the at least one first terminal device, wherein the fifth frequency band is located in another fixed position within the frequency spectrum to be allocated by the network device;
wherein the at least one broadcasting channel of the first type of the at least one first terminal device includes at least one of Synchronization Signal Block (SSB), Total Radiated Sensitivity (TRS), and Channel State Information-Reference Signal (CSI-RS).

10. The method of claim 9, wherein the first frequency band is directly adjacent to the fifth frequency band.

11. The method of claim 9, wherein the method further comprises:
allocating a sixth frequency band for at least one broadcasting channel of a second type of the at least one first terminal device, wherein the position of the sixth frequency band is changeable within the frequency spectrum to be allocated by the network device;
wherein the sixth frequency band is directly adjacent to the fifth frequency band.

12. The method of claim 11, wherein the at least one broadcasting channel of the second type of the at least one first terminal device includes at least Physical Downlink Shared Channel (PDSCH) of LTE.

13. The method of claim 11, wherein the first frequency band is directly adjacent to the sixth frequency band.

14. The method of claim 1, wherein NR utilizes different numerology from LTE.

15. A network device, comprising a processor and a memory configured to store instructions, wherein the instructions, when executed by the processor, cause the network device to perform the method of claim 1.

16. A non-transitory computer-readable medium comprising, stored thereupon, a computer program product comprising program code portions for performing the method of claim 1 when the computer program product is executed on one or more computing devices.

17. A method for resource allocation at a network device, comprising:
allocating a first frequency band to at least one first terminal device utilizing a first radio access technology (RAT); and
allocating a second frequency band to at least one second terminal device utilizing a second RAT;
wherein the first frequency band is at least partly overlapped with the second frequency band, wherein the overlapped part of the first and second frequency bands is spatially multiplexed between the at least one first terminal device and the at least one second terminal device, wherein the first frequency band is allocated for at least one non-broadcasting channel of the at least one first terminal device, and wherein the second frequency band is allocated for at least one non- broadcasting channel of the at least one second terminal device.

18. The method of claim 17, wherein the at least one non-broadcasting channel of the at least one first terminal device includes Physical Downlink Shared Channel (PDSCH) of LTE.

19. A method for resource allocation at a network device, comprising:
allocating a first frequency band to at least one first terminal device utilizing a first radio access technology (RAT), the first RAT comprising long term evolution (LTE); and
allocating a second frequency band to at least one second terminal device utilizing a second RAT, the second RAT comprising new radio (NR); and
allocating a third frequency band for Sounding Reference Signal (SRS) of LTE and/or at least one broadcasting channel of a first type of the at least one first terminal device, wherein the third frequency band is located in another fixed position within the frequency spectrum to be allocated by the network device;
wherein the first frequency band is at least partly overlapped with the second frequency band, and—wherein the overlapped part of the first and second frequency bands is spatially multiplexed between the at least one first terminal device and the at least one second terminal device, and wherein the at least one broadcasting channel of the first type of the at least one first terminal device includes at least one of Cell Reference Signal (CRS), Physical Downlink Control Channel (PDCCH), Physical Control Format Indicator Channel (PCIFICH), Synchronization Signal Block (SSB), Total Radiated Sensitivity (TRS), and Channel State Information-Reference Signal (CSI-RS).

20. The method of claim 19, wherein the first frequency band is directly adjacent to the third frequency band.

* * * * *